United States Patent
Tsumura et al.

(10) Patent No.: US 7,688,361 B2
(45) Date of Patent: Mar. 30, 2010

(54) IMAGE PROCESSOR INCLUDING MEMORY CONTROLLER WHICH STARTS READING IMAGE DATA BEFORE WRITING SCREENFUL OF IMAGE DATA IS COMPLETED

(75) Inventors: Keiichi Tsumura, Hyogo (JP); Hiroki Hachiyama, Kyoto (JP); Toshiya Fujii, Shiga (JP)

(73) Assignee: Panasonic Corporation, Osaka (JP)

( * ) Notice: Subject to any disclaimer, the term of this patent is extended or adjusted under 35 U.S.C. 154(b) by 1270 days.

(21) Appl. No.: 10/857,850

(22) Filed: Jun. 2, 2004

(65) Prior Publication Data

US 2004/0252206 A1 Dec. 16, 2004

(30) Foreign Application Priority Data

Jun. 12, 2003 (JP) ............................. 2003-167411

(51) Int. Cl.
*H04N 5/76* (2006.01)
(52) U.S. Cl. .............................. 348/231.99; 348/231.1; 348/231.2
(58) Field of Classification Search ............. 348/231.99
See application file for complete search history.

(56) References Cited

U.S. PATENT DOCUMENTS 5,444,483 A * 8/1995 Maeda .................... 348/231.6
5,960,155 A * 9/1999 Fukuoka et al. ............. 386/117
6,134,347 A 10/2000 Niwamoto
6,239,838 B1 * 5/2001 Lee et al. ................ 348/240.99
6,642,962 B1 * 11/2003 Lin et al. ..................... 348/252
6,847,399 B1 * 1/2005 Ang ........................... 348/308

FOREIGN PATENT DOCUMENTS

| JP | 09-247518 | 9/1997 |
| JP | 2001-285778 A | 10/2001 |
| JP | 2002-112086 | 4/2002 |
| JP | 2002-354248 | 12/2002 |
| JP | 2004-40260 A | 2/2004 |

OTHER PUBLICATIONS

U.S. Appl. No. 10/607,307.
Japanese Office Action, with English translation, issued in Japanese Patent Application No. JP 2003-167411, mailed Jan. 6, 2009.

* cited by examiner

*Primary Examiner*—Nhan T Tran
*Assistant Examiner*—Chia-Wei A Chen
(74) *Attorney, Agent, or Firm*—McDermott Will & Emery LLP (57) ABSTRACT

A pixel signal output from a solid-state imaging device is converted into image data and recorded in a memory by a writing controller. A reading controller reads the image data from the memory by blocks and performs Y/C processing on the image data that has been read out by blocks. A JPEG processing section performs compression coding. The coded data is not recorded in the memory but is written on a recording medium by a DMA processing section.

3 Claims, 9 Drawing Sheets

WRITING TO MEMORY

FIG. 4B

READING FROM MEMORY

WRITING TO MEMORY

FIG. 9B (PRIOR ART)

READING FROM MEMORY

IMAGE PROCESSOR INCLUDING MEMORY CONTROLLER WHICH STARTS READING IMAGE DATA BEFORE WRITING SCREENFUL OF IMAGE DATA IS COMPLETED

BACKGROUND OF THE INVENTION

The present invention relates to a technique regarding image processors for recording image data acquired by solid-state imaging devices on media.

In recent years, with increase in the number of pixels processed by imaging devices, it has become more and more necessary for devices such as digital still cameras and camera-equipped cellular phones to process images with a large number of pixels at higher speed. In addition, demand for continuous shooting function similar to that of silver salt cameras has been growing. To increase the number of pictures that can be continuously shot and to process these pictures at high speed, a memory region needs a large capacity in proportion to the number of pictures to be continuously shot.

Figure 6:
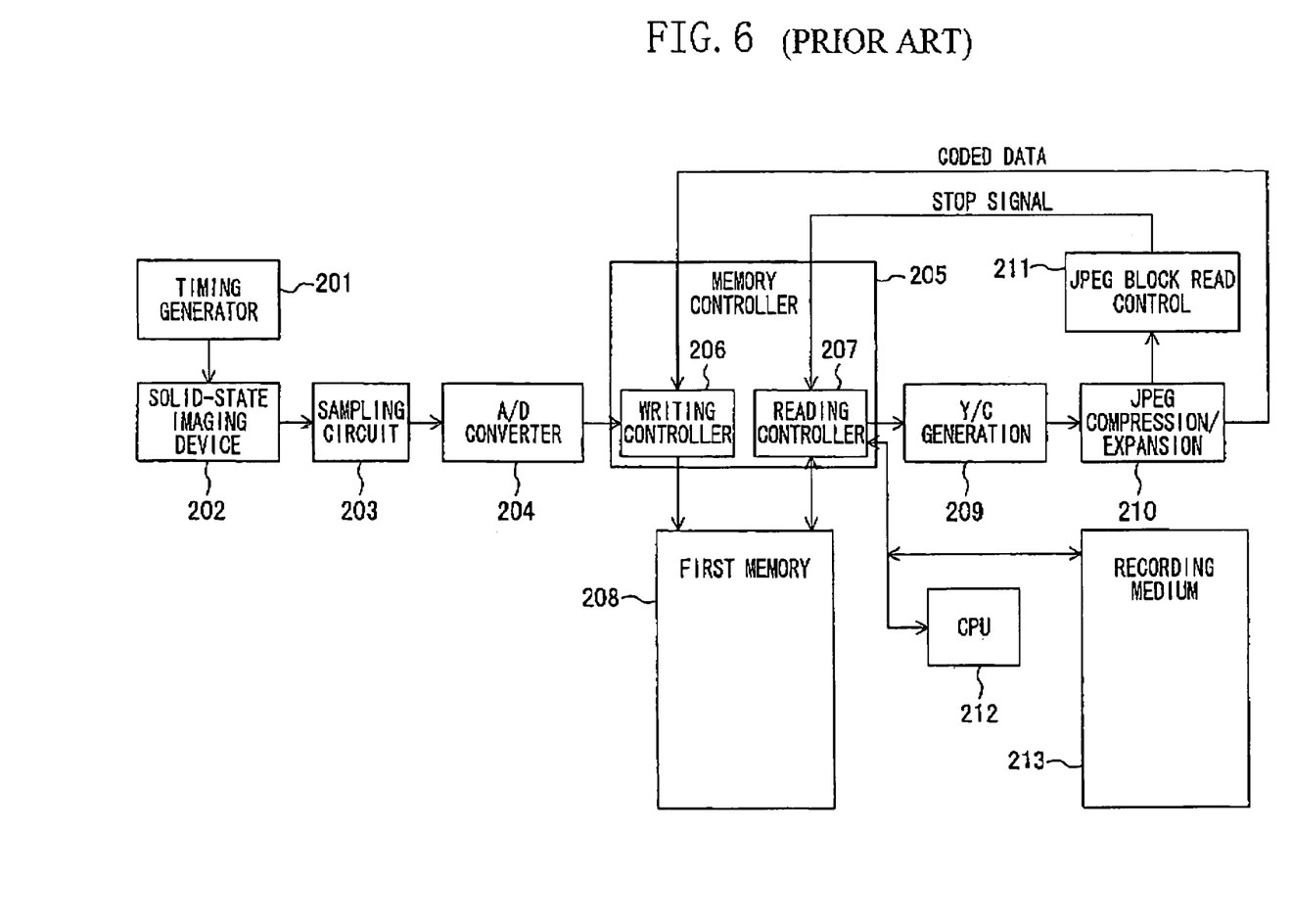
FIG. 6 is a block diagram showing a configuration of a known example.

FIG. 6 is an example of configuration of a known image processor. The image processor obtains JPEG-compressed image data from an output signal from a CCD solid-state imaging device 202 that produces a progressive output, and records the obtained data on a medium 213. The solid-state imaging device 202 is driven by a transfer pulse signal output from a timing generator 201 and outputs a pixel potential signal according to a pixel charge of a captured image. The pixel potential signal output from the solid-state imaging device 202 is subjected to noise reduction by a correlated dual sampling circuit 203, quantized by an A/D converter 204, and then supplied, as image data, to a writing controller 206 in a memory controller 205.

Figure 7A:
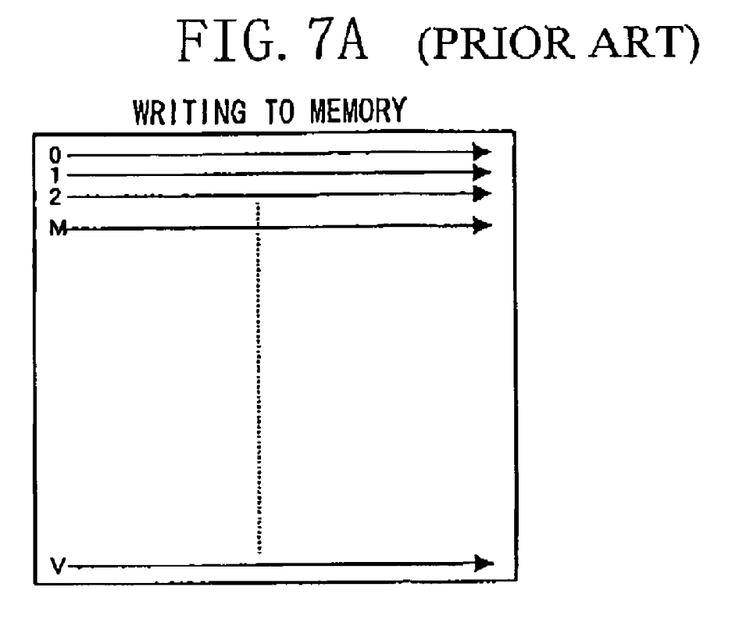
FIGS. 7A and 7B are diagrams showing access operation to a memory in the configuration shown in FIG. 6.

As shown in FIG. 7A, the writing controller 206 writes the image data in a memory 208 in order from a write start address. As in the pixel arrangement of the solid-state imaging device 202, when writing of the image data for one horizontal line is completed, the position of writing vertically shifts to a next line and then horizontally returns to the original position on the next line so that writing for the next horizontal line is performed. Then, such writing operation continues until a screenful of image data is completely written in the memory 208.

Figure 7B:
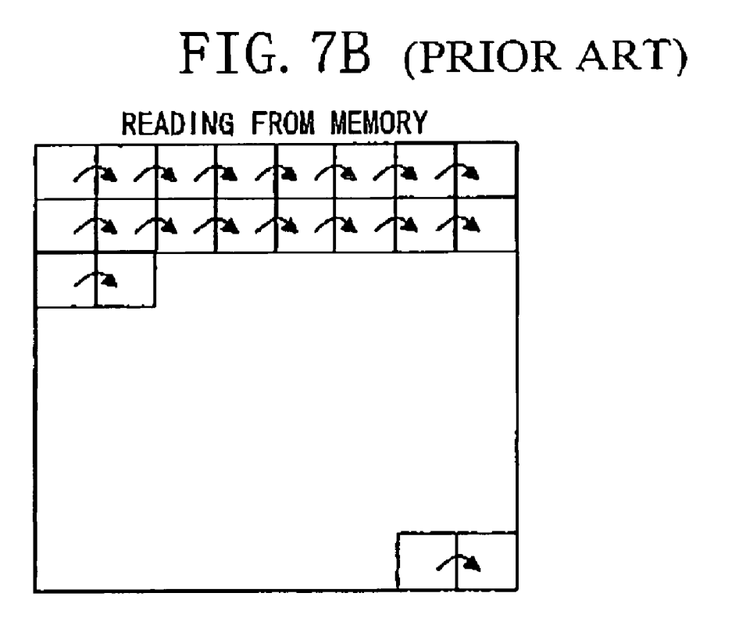

When a screenful of image data is completely written in the memory 208, a reading controller 207 in the memory controller 205 reads the image data by Y/C processing blocks, as shown in FIG. 7B. The image data that has been read out by blocks is supplied to a Y/C processing section 209. The Y/C processing section 209 generates luminance signals Y and color-difference signals Cr•Cb from the image data by blocks, and these signals are sent to a JPEG processing section 210. When the luminance signals and the color-difference signals by JPEG processing blocks are accumulated in the JPEG processing section 210, JPEG-compression coding starts and coded data is output. The output coded data is written in the memory 208 by the writing controller 206.

When a screenful of coded data, i.e., JPEG-compressed image data, is written in the memory 208, the JPEG-compressed image data read out from the memory 208 is recoded on a recording medium 213 via a CPU bus in accordance with an instruction given by a CPU 212.

Figure 8:
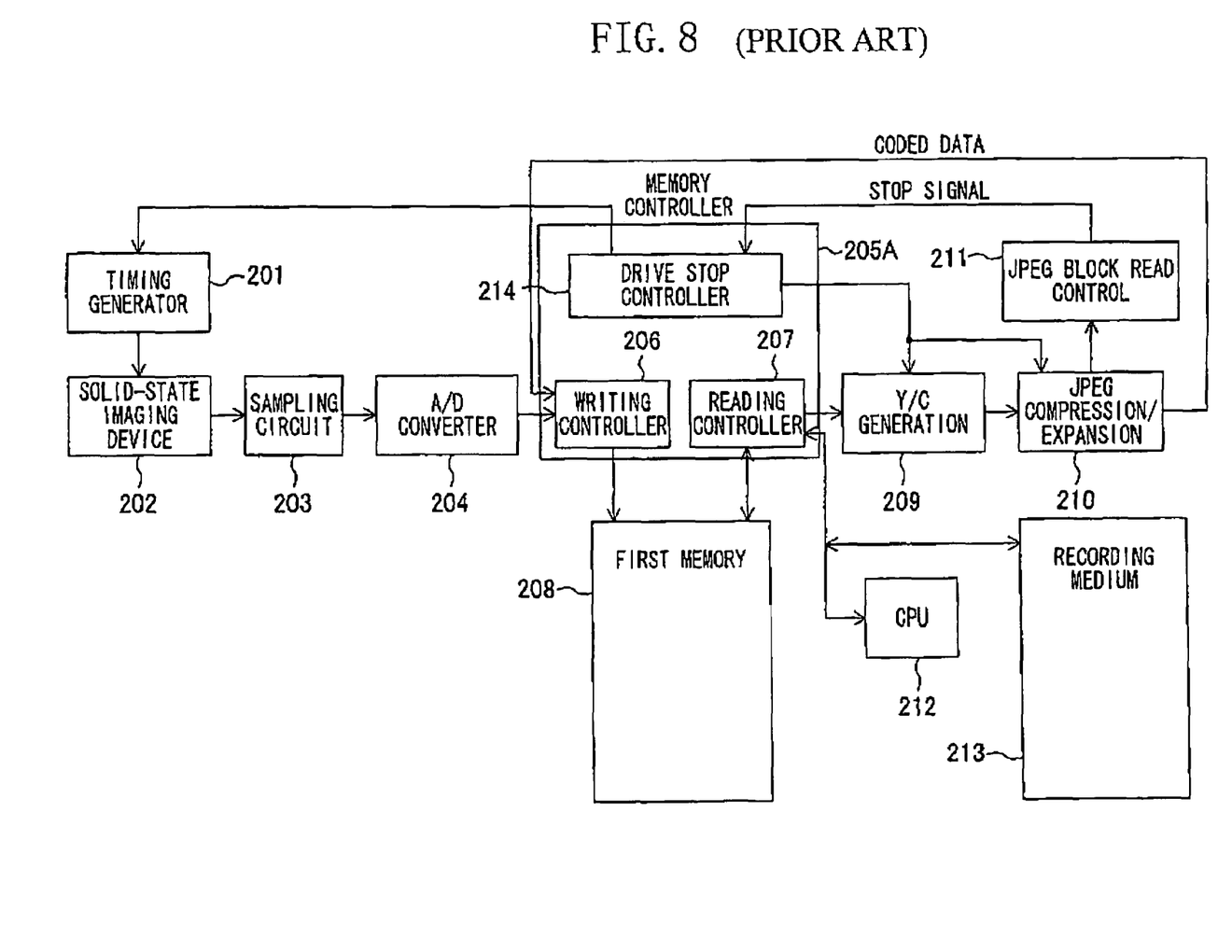
FIG. 8 is a block diagram showing a configuration of another known example.
Figure 9A:
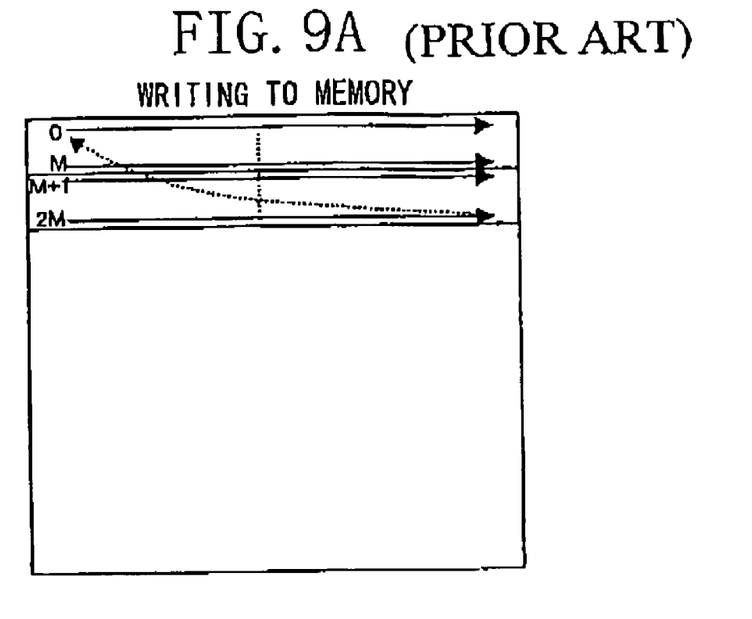
FIGS. 9A and 9B are diagrams showing access operation to a memory in the configuration shown in FIG. 8.
Figure 9B:
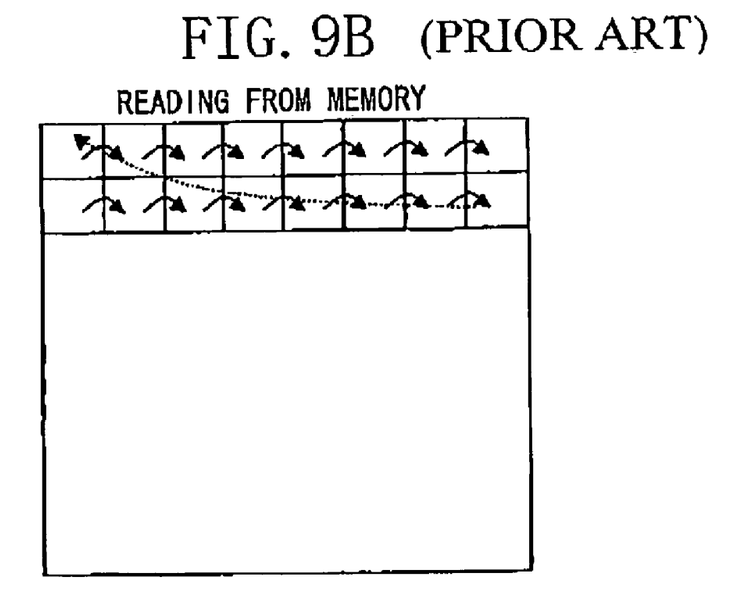

FIG. 8 shows another example of configuration of the known image processor (see Japanese Unexamined Patent Publication No. 2001-285776). In FIG. 8, improvements are made to the configuration shown in FIG. 6 so that high-speed processing is implemented and an image with a large number of pixels is coded in a small memory region. Specifically, a memory controller 205A includes a drive stop controller 214. The drive stop controller 214 stops a transfer pulse from the timing generator 201 to the solid-state imaging device 202 and controls stopping/driving of both the Y/C processing section 209 and the JPEG processing unit 210, in accordance with the positional relationship between a writing address at which pixel data is written in the memory 208 and a datablock reading address. This allows writing for the next screen to start before coding for the current screen is completed in continuous shooting. Accordingly, image coding is performed at higher speed than in conventional processing. If at least two line areas each including a minimum unit block for JPEG processing, i.e., M×2 lines, are provided as shown in FIGS. 9A and 9B, JPEG processing for one screen is implemented. Therefore, a screenful of image data does not need to be completely stored in the memory 208 to generate a screenful of coded data, thus reducing the memory capacity.

SUMMARY OF THE INVENTION

In the known example shown in FIG. 8, a memory capacity to be used before conversion of captured image data into a JPEG-compressed image can be reduced.

However, none of the examples shown in FIGS. 6 and 8 is capable of recording JPEG-compressed image data on the recording medium 213 at high speed to catch up with the speed of continuous shooting. Accordingly, the continuous shooting needs a memory capacity for JPEG-compressed images in proportion to the number of continuously-shot pictures, and it is also necessary to temporally write JPEG-compressed image data corresponding to the pictures in the memory 208 and then write the data on the recording medium 213. As a result, a large-capacity memory is needed.

It is therefore an object of the present invention to reduce a memory capacity necessary for implementing continuous shooting in an image processor for obtaining compressed image data from an output of a solid-state imaging device and recording the data on a medium.

In view of recent increase in the speed of recording on media, according to the present invention, an imaging device for producing a progressive output, a high-speed image processing scheme and a recording medium on which data is recorded at high speed are combined. Specifically, image data as a progressive output from a solid-state imaging device such as a CCD or MOS sensor is stored in a minimum memory and then read out by blocks, and then Y/C processing, compression, and recording on a medium, are successively performed on a block-by-block basis.

Specifically, according to the present invention, an image processor includes: a solid-state imaging device for producing a progressive output; a signal converter for converting a pixel signal output from the solid-state imaging device into image data; a memory controller for writing the image data output from the signal converter in a memory and for reading the image data from the memory by predetermined blocks; a Y/C processing section for performing Y/C processing on the image data by the predetermined blocks read out by the memory controller; a compression-processing section for performing compression coding on image data output from the Y/C processing section, by blocks; and a recording section for writing coded data output from the compression-processing section on a recording medium.

According to the present invention, coded data subjected to compression coding is not stored in the memory but is directly recorded on a recording medium by blocks. Accordingly, a large-capacity memory, which has been conventionally needed, is not necessary and continuous shooting at high speed is implemented. Since the capacity of a recording medium is generally much larger than that of a memory, the upper limit of the number of pictures that can be continuously shot, which has been conventionally limited by the memory capacity, is limited by the capacity of the recording medium. As a result, the number of pictures that can be continuously shot increases considerably.

The solid-state imaging device may be constituted by a MOS sensor and outputs a pixel signal by the predetermined blocks, instead of progressive output. Then, the solid-state imaging device originally produces a block output, so that a memory capacity for conversion in blocks is not needed. Therefore, the memory capacity is further reduced.

The Y/C processing section is preferably configured to perform zooming in addition to the Y/C processing. Then, zooming of data is performed by blocks, so that a memory capacity for zooming is not needed.

DESCRIPTION OF THE PREFERRED EMBODIMENTS

Hereinafter, an embodiment of the present invention will be described with reference to the drawings.

Figure 1:
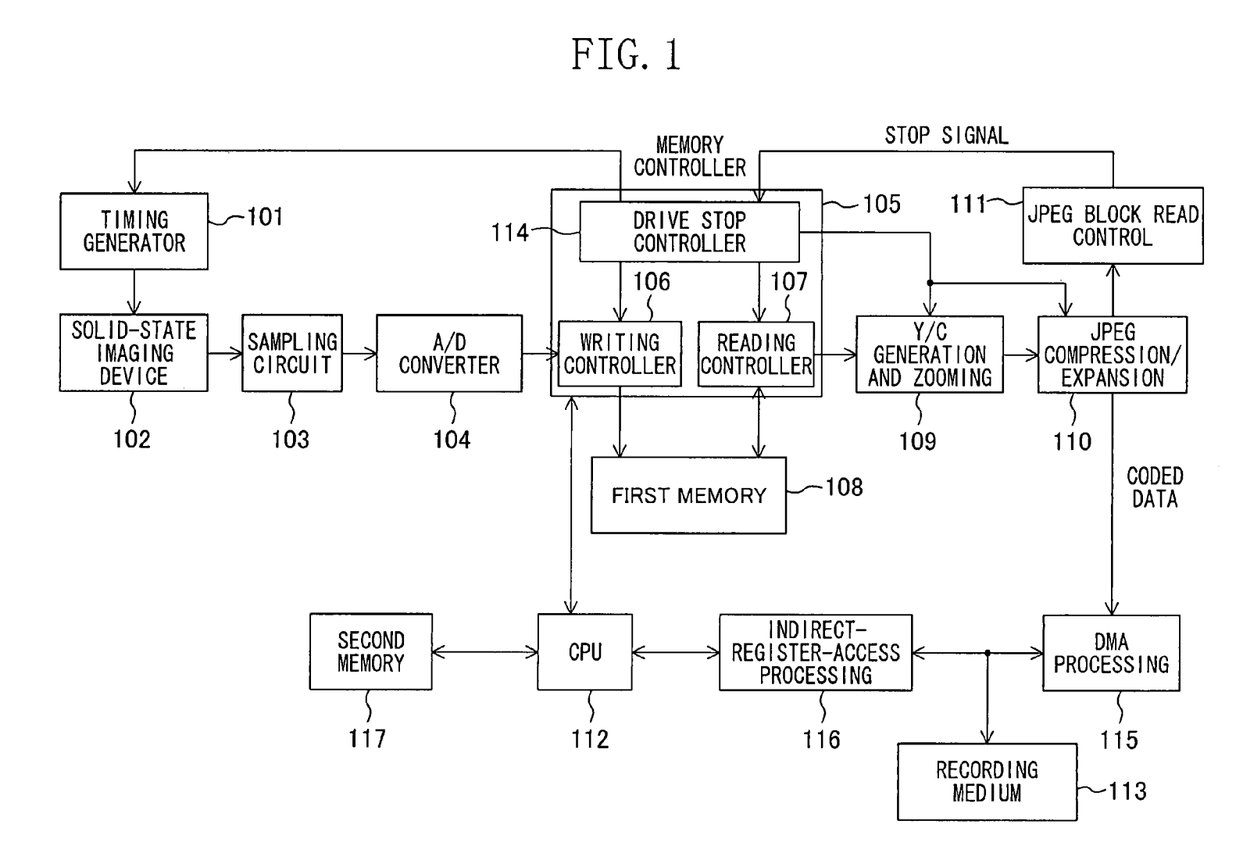
FIG. 1 is a block diagram showing a configuration of an image processor according to an embodiment of the present invention.

FIG. 1 is a block diagram showing a configuration of an image processor according to an embodiment of the present invention. In this embodiment, as an image processing scheme according to the present invention, image data as a progressive output from a solid-state imaging device such as a CCD or a CMOS sensor is stored in a minimum memory and is read out by blocks, and then Y/C signal processing, zooming, compression, and recording on a medium, are successively performed on a block-by-block basis.

In FIG. 1, reference numeral 101 denotes a timing generator, reference numeral 102 denotes a solid-state imaging device for outputting a signal of a captured image in accordance with an output signal from the timing generator 101, reference numeral 103 denotes a sampling circuit, reference numeral 104 denotes an A/D converter, reference numeral 105 denotes a memory controller, reference numeral 108 denotes a first memory serving as a memory constituted by, for example, an SDRAM, reference numeral 109 denotes a Y/C processing section for performing Y/C processing and, if necessary, zooming, reference numeral 110 denotes a JPEG processing section serving as a compression-processing section for compressing and expanding a signal, reference numeral 111 denotes a JPEG block read controlling section, reference numeral 112 denotes a CPU, reference numeral 113 denotes a recording medium, reference numeral 115 denotes a DMA processing section serving as a recording section, reference numeral 116 denotes an indirect-register-access processing section, and reference numeral 117 denotes a second memory. The memory controller 105 includes: a writing controller 106, a reading controller 107 and a drive stop controller 114. The sampling circuit 103 and the A/D converter 104 constitute a signal converter.

Hereinafter, operation of the image processor shown in FIG. 1 from when an image is captured to when image data is recorded on a medium will be described.

The solid-state imaging device 102 is constituted by a CCD or CMOS sensor, for example, and receives an output signal from the timing generator 101 to output a signal of a captured image.

Figure 2:
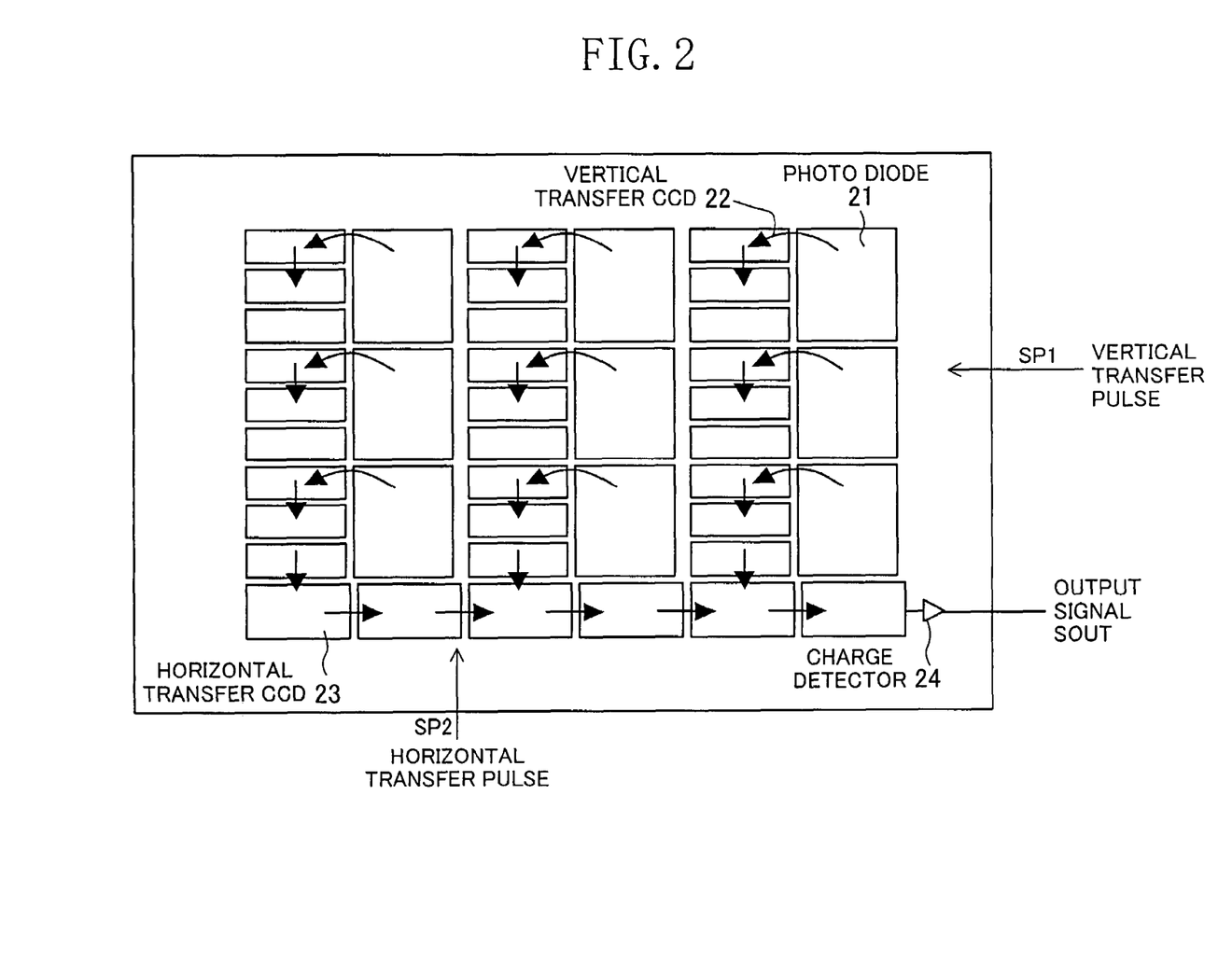
FIG. 2 is an example of configuration of a solid-state imaging device constituted by CCDs.

FIG. 2 shows an example of configuration of a CCD solid-state imaging device. Vertical transfer CCDs 22 and horizontal transfer CCDs 23 are successively driven by a vertical transfer pulse SPI and a horizontal transfer pulse SP2, respectively, which are output from the timing generator 101. In FIG. 2, upon the reception of the output signal from the timing generator 101, pixel charges move from respective photo diodes 21 to the vertical transfer CCDs 22 and then are sequentially transferred to the horizontal transfer CCDs 23 under the last line, in accordance with the vertical transfer pulse SP1 received from the timing generator 101. The pixel charges for one horizontal line transferred to the horizontal transfer CCDs 23 are sequentially transferred to a charge detector 24 in accordance with the horizontal transfer pulse SP2 received from the timing generator 101. The charge detector 24 converts the pixel charges into a potential signal and outputs the signal as an output signal SOUT. After all the pixel charges for one horizontal line have been sent to the charge detector 24 by the horizontal transfer CCDs 23 and converted into the potential signal, pixel charges in part of the vertical transfer CCDs 22 adjacent to the horizontal transfer CCDs 23 are transferred to the horizontal transfer CCDs 23. This operation is repeated, thereby converting a screenful of pixel charges into potential signals and outputting the signals.

Figure 3:
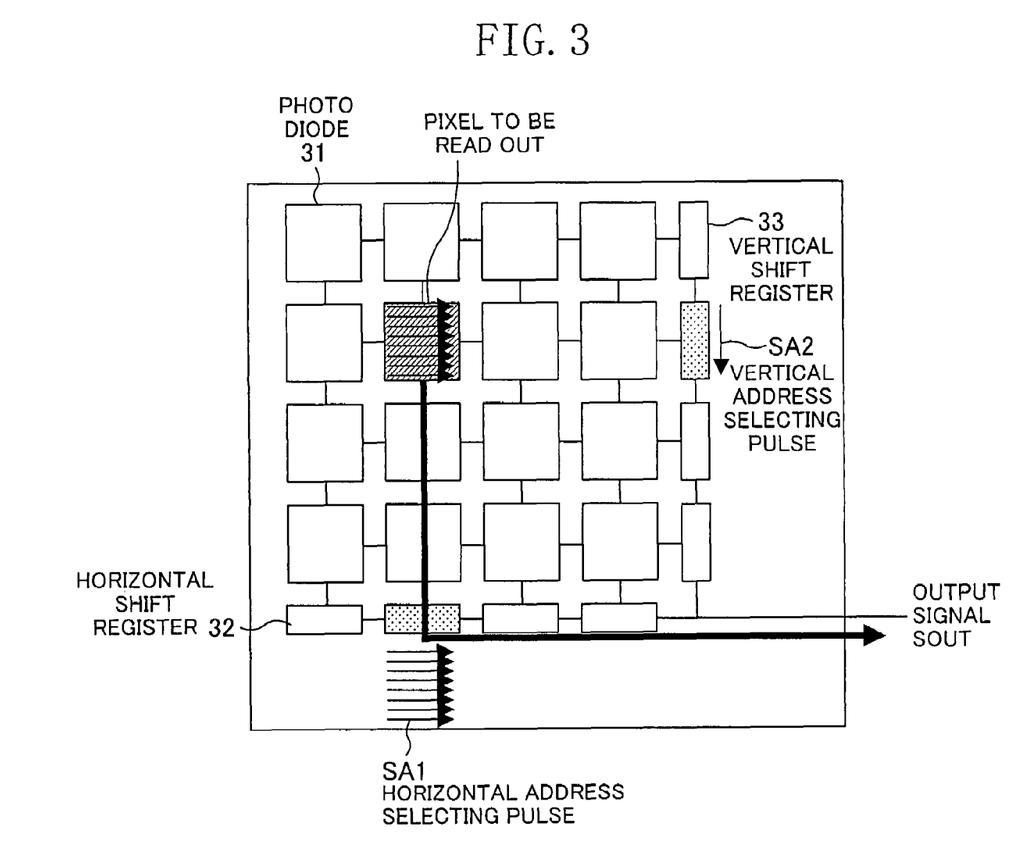
FIG. 3 is an example of configuration of a solid-state imaging device constituted by MOSs.

FIG. 3 shows an example of configuration of a MOS solid-state imaging device. In the case of the configuration shown in FIG. 3, upon the reception of the output signal from the timing generator 101, horizontal shift registers 32 and vertical shift registers 33 operate so that photo diodes 31 at respective associated horizontal and vertical addresses are sequentially selected and potential signals are read out, thereby obtaining output signals SOUT.

The pixel potential signals output from the solid-state imaging device 102 are subjected to noise reduction by the correlated dual sampling circuit 103, quantized by the A/D converter 104 and output as image data. This image data is supplied to the writing controller 106 in the memory controller 105.

Figure 4A:
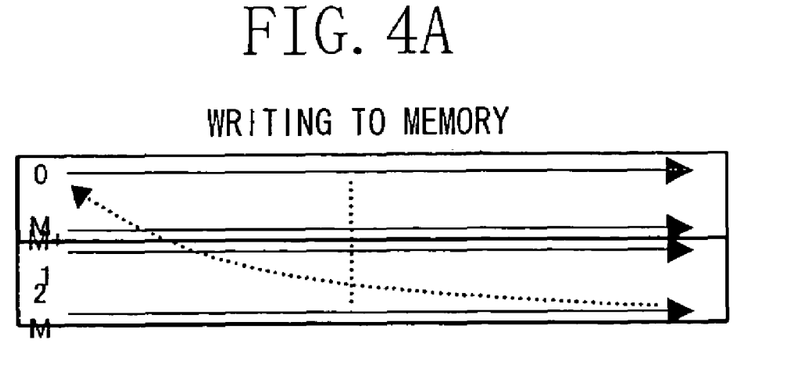
FIGS. 4A and 4B are diagrams showing writing operation and reading operation, respectively, in a memory shown in FIG. 1.

As shown in FIG. 4A, the writing controller 106 writes the received image data into the first memory 108. The writing of the image data starts from a memory write start address. As in the pixel arrangement of the solid-state imaging device 102, when writing for one horizontal line is completed, the position of the writing of image data vertically shifts to a next line and then horizontally returns to the original position on the next line, and writing for the next horizontal line is carried out.

Figure 5:
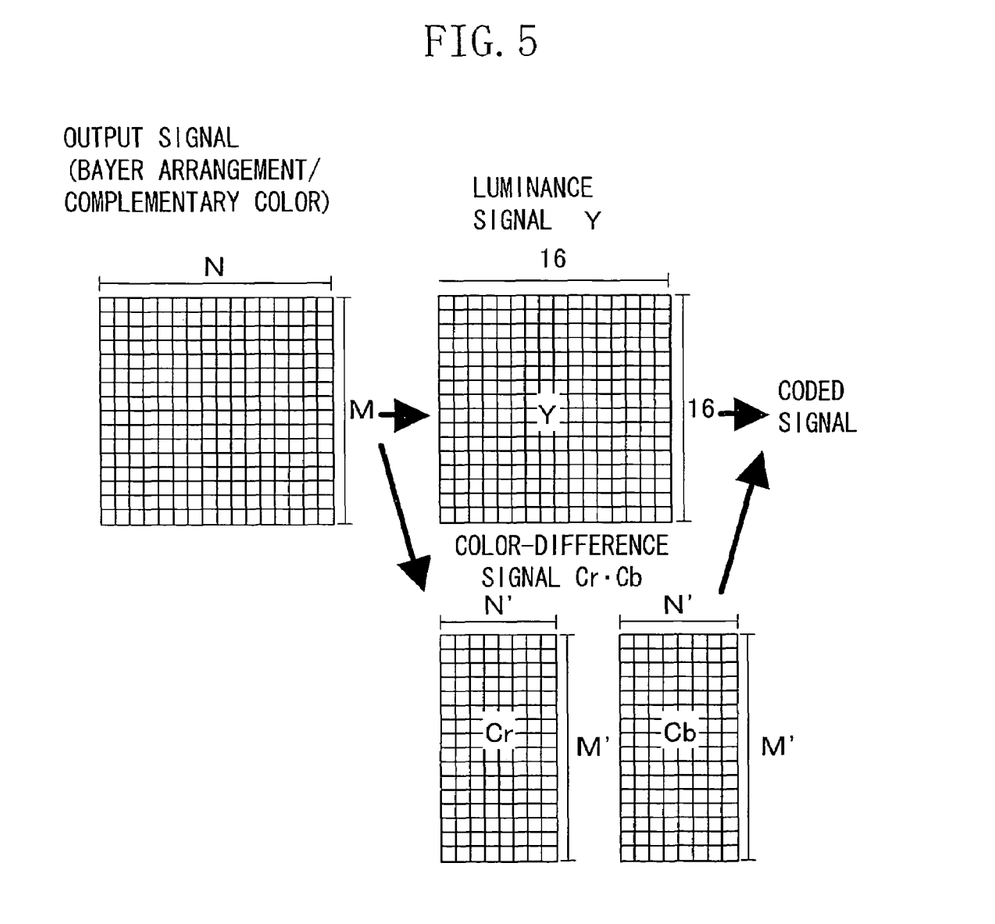
FIG. 5 is an illustration showing a minimum unit block for Y/C read processing.

FIG. 5 is a conceptual illustration showing a minimum unit block for Y/C processing. In this embodiment, pixel data (a pixel signal in a Bayer arrangement or a complementary color arrangement) written in the first memory 108 is read out by blocks, each made of (M×N) pixels. The minimum unit for JPEG coding is a luminance signal for (8×8) pixels and a color-difference signal for (8×8) pixels. The block size (M×N) required to generate the minimum-unit signals differs depending on a block spatial filter for use in a Y/C processing scheme. In the case of zooming, this block size also differs depending on the magnification in the zooming.

If zooming is not considered, it is sufficient that the capacity of the first memory 108 is (M+8)×(the number of horizontal pixels) in the case of a YUV422 output, and is (M+16)× (the number of horizontal pixels) in the case of a YUV420 output. When writing for (M+8) or (M+16) lines is completed, the address in the first memory 108 is returned to the initial address and the same writing operation is repeated until a screenful of data is completely written. In this case, data before the (M+8) or (M+16) lines are overwritten, but this causes no serious problem because block reading of the data has been already completed. In addition, if the writing address and reading address in the memory are devised such that reading starts from a memory address immediately after the block reading, the memory capacity is further reduced (see Japanese Unexamined Patent Publication No. 2004-040260).

Figure 4B:
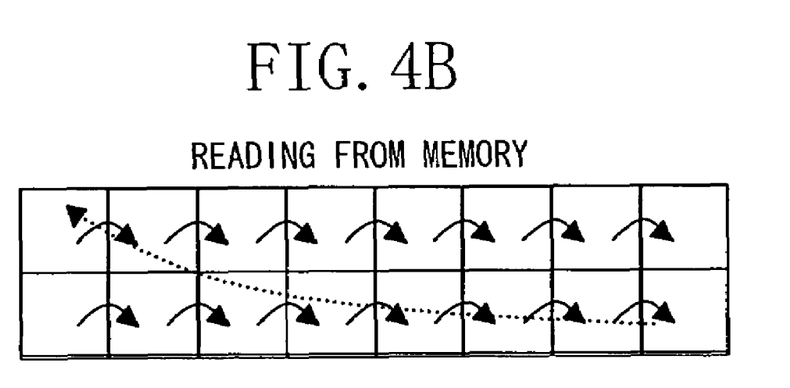

In this manner, when image data for M lines each including a minimum unit block to be read is written in the first memory 108, the reading controller 107 in the memory controller 105 starts reading of image data for Y/C processing by predetermined blocks before writing of a screenful of image data is completed, as shown in FIG. 4B. In this case, each of the predetermined blocks is made of (M×N) pixels. The Y/C processing section 109 generates a luminance signal Y and a color-difference signal Cr•Cb from data of (M×N) pixels which has been read out from the first memory 108 and, if necessary, performs zooming. When luminance signals Y and color-difference signals Cr•Cb by JPEG processing blocks are accumulated in the JPEG processing section 110, the JPEG processing section 110 initiates coding and outputs coded data.

It should be noted that the time required of the JPEG processing signal 110 to perform cording differs depending on the contents of the luminance signal and the color-difference signal. Accordingly, the JPEG block reading controller 111 generates a stop signal to make the memory controller 105 stop reading operation, in accordance with the load in the coding performed by the JPEG processing block 110. Upon the reception of the stop signal, the reading controller 107 suspends reading from the first memory 108. The position of reading in a Y/C processing block horizontally moves every time the coding in the block terminates. When coding is performed for all the blocks arranged in the horizontal direction, the position horizontally returns and vertically shifts to the next target block, and reading operation continues. This operation is repeated until a screenful of image data is completely processed. After this block reading operation, the Y/C processing section 109 and the JPEG processing section 110 successively perform processing on a block-by-block basis.

The drive stop controller 114 in the memory controller 105 provides, to the timing generator 101, an instruction to stop/drive pixel transfer by the solid-state imaging device 102 and controls stopping/driving of both the Y/C processing section 109 and the JPEG processing unit 110, in accordance with the positional relationship between a writing address at which image data is written in the first memory 108 and a reading address in a Y/C processing block. This allows writing for the next screen to start before coding for the current screen is completed, even in a continuous shooting mode. Accordingly, image coding is performed at high speed.

Then, JPEG-compressed coded data that has been processed by blocks is written on the recording medium 113 by the DMA processing section 115. In conventional schemes, a screenful of coded data or coded data for continuously-shot pictures is written in a memory and then written on a recording medium. On the other hand, in this embodiment, immediately after JPEG-compressed coded data has been output, writing on the recording medium 113 by blocks starts.

First, before writing of coded data starts, directory entry information and FAT data recorded on the recording medium 113 are written in the second memory 117 by the indirect-register-access processing section 116 in accordance with an instruction given by the CPU 112. The FAT data is data in which cluster numbers are arranged in the order of usage of clusters with respect to one file. The unused cluster numbers constitute free space. Thereafter, the CPU 112 reads the FAT data from the second memory 117 and calculates free space on the recording medium 113.

The CPU 112 issues a writing command using the indirect-register-access processing section 116 at the timing of outputting the coded data. This allows the DMA processing section 115 to write the coded data on the recording medium 113 by blocks. During this writing, the CPU 112 reads next FAT data from the second memory 117 and calculates free space on the recording medium 113 so that writing of coded data in the next block on the recording medium 113 does not delay. This operation is repeated until writing of the coded data on the recording medium 113 is completed.

Then, a thumbnail code is generated and written on the recording medium 113 by the DMA processing section 115. Then, directory entry information is written on the recording medium 113 by using an indirect register address from the CPU 112 or DMA processing and, if necessary, the FAT data on the recording medium 113 is rearranged.

If JPEG header information is not written before writing of image data, the JPEG header information is written after the completion of writing of the image data, and then the FAT data is rewritten such that the address of the JPEG header information is located before that of the image data.

Now, rearrangement of FAT data will be described. In a JPEG, data is generally arranged in the order of (a) header (directory entry, FAT), (b) thumbnail code and (c) image code. Accordingly, in the general writing order, it is sufficient that FAT data is arranged in the order of (a)→(b)→(c). However, if data is written in the order of (c) image code, (b) thumbnail code and (a) header, the physical address in data writing is not changed and the order of the FAT data is changed to the order of (c)→(b)→(a).

In this embodiment, firstly, a screenful of coded image data is written by blocks. Then, when the processing has an allowance, zooming-in, generation of a thumbnail code, writing of the thumbnail code and writing of a header are performed in this order. Under a conventional scheme with which FAT data is not rewritten, an interval between pictures in continuous shooting is limited to the time for (a)+(b)+(c). On the other hand, in this embodiment, the interval is limited to the time only for (c). Accordingly, high-speed writing on the recording medium 113 is achieved.

If the solid-state imaging device 102 is constituted by a MOS sensor, a cutout image which is arbitrarily cutout from a screen is obtained. If block reading is carried out based on a Y/C processing block by utilizing this configuration, block conversion in the first memory 108 is unnecessary, thus achieving a smaller memory capacity.

As described above, according to the present invention, coded data subjected to compression coding is not stored in a memory but is directly recorded on a recording medium by blocks. Accordingly, a large-capacity memory, which has been needed in conventional schemes, is unnecessary and, in addition, high-speed continuous shooting is implemented. Further, the upper limit of the number of pictures that can be continuously shot, which has been limited by a memory capacity in conventional schemes, is limited by the capacity of the recording medium, so that the number of pictures that can be continuously shot increases considerably.

An external DRAM or the like has been conventionally needed as a large-capacity memory. On the other hand, according to the present invention, a memory with a minimum capacity is sufficient, so that LSI including the memory can be implemented on a single chip. As a result, cost reduction, lower power consumption and space saving are achieved. In addition, high-speed operation is achieved by utilizing the feature of a large width of a bus obtained by incorporating the memory. These effects are advantageous in systems such as digital still cameras or camera-equipped cellular phones.

What is claimed is:

1. An image processor, comprising:
a solid-state imaging device for producing a progressive output;
a signal converter for converting a pixel signal output from the solid-state imaging device into image data;
a line memory;
a memory controller for writing the image data output from the signal converter to the line memory and for reading the image data from the line memory by predetermined blocks;
a Y/C processing section for performing Y/C processing on the image data by the predetermined blocks read out by the memory controller;
a compression-processing section for performing compression coding on image data output from the Y/C processing section, by blocks;
a recording section for writing coded data output from the compression-processing section on a recording medium having a FAT filesystem, by blocks;
a second memory in which FAT data corresponding to the filesystem of the recording medium is written; and
a CPU for reading the FAT data from the second memory, calculating free space on the recording medium using the FAT data recorded on the second memory, and controlling the recording section so that writing of coded data on the recording medium does not delay,
wherein the memory controller starts reading of the image data from the line memory for Y/C processing by the predetermined blocks before writing of a screenful of image data to the line memory from the signal converter is completed, and
wherein if writing of coded data to the recording medium is completed before writing of corresponding header information to the recording medium, the FAT data on the recording medium is rewritten such that the address of the header information is located before that of the coded data.

2. An image processor comprising:
a solid-state imaging device constituted by a MOS sensor and outputting a pixel signal by predetermined blocks;
a signal converter for converting a pixel signal output from the solid-state imaging device into image data;
a line memory;
a memory controller for writing the image data output from the signal converter to the line memory and for reading the image data from the line memory by predetermined blocks;
a Y/C processing section for performing Y/C processing on the image data by the predetermined blocks read out by the memory controller;
a compression-processing section for performing compression coding on image data output from the Y/C processing section, by blocks;
a recording section for writing coded data output from the compression-processing section on a recording medium having a FAT filesystem, by blocks;
a second memory in which FAT data corresponding to the filesystem of the recording medium is written; and
a CPU for reading the FAT data from the second memory, calculating free space on the recording medium using the FAT data recorded on the second memory, and controlling the recording section so that writing of coded data on the recording medium does not delay,
wherein the memory controller starts reading of the image data from the line memory for Y/C processing by the predetermined blocks before writing of a screenful of image data to the line memory from the signal converter is completed, and
wherein if writing of coded data to the recording medium is completed before writing of corresponding header information to the recording medium, the FAT data on the recording medium is rewritten such that the address of the header information is located before that of the coded data.

3. The image processor of claim 1, wherein the Y/C processing section is configured to perform zooming in addition to the Y/C processing.

* * * * *